United States Patent
Gong et al.

(10) Patent No.: US 8,571,036 B2
(45) Date of Patent: Oct. 29, 2013

(54) DIRECTIONAL MEDIA ACCESS TECHNIQUES WITH SPATIAL REUSE

(75) Inventors: Michelle X. Gong, Sunnyvale, CA (US); Dmitry Akhmetov, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 490 days.

(21) Appl. No.: 12/830,595

(22) Filed: Jul. 6, 2010

(65) Prior Publication Data

US 2012/0008568 A1    Jan. 12, 2012

(51) Int. Cl.
*H04L 12/28* (2006.01)
*H04L 12/56* (2011.01)

(52) U.S. Cl.
USPC ............... 370/395.3; 370/395.4; 370/395.42

(58) Field of Classification Search
USPC .................... 370/395.3, 395.4, 395.42
See application file for complete search history.

(56) References Cited

U.S. PATENT DOCUMENTS

| | | | | |
|---|---|---|---|---|
| 5,881,095 A | * | 3/1999 | Cadd ............................ | 375/132 |
| 7,653,408 B1 | * | 1/2010 | Kopikare et al. ............ | 455/522 |
| 2003/0157899 A1 | * | 8/2003 | Trossen et al. ............... | 455/69 |
| 2006/0055958 A1 | * | 3/2006 | Kim et al. ..................... | 358/1.14 |
| 2006/0274680 A1 | * | 12/2006 | Zhu et al. ...................... | 370/278 |
| 2007/0140168 A1 | * | 6/2007 | Laroia et al. ................. | 370/330 |
| 2008/0130565 A1 | * | 6/2008 | Jeong et al. .................. | 370/329 |
| 2009/0228983 A1 | | 9/2009 | Qin et al. | |
| 2009/0232073 A1 | * | 9/2009 | Yan et al. ..................... | 370/329 |
| 2009/0257413 A1 | * | 10/2009 | Smith et al. .................. | 370/338 |
| 2009/0286465 A1 | * | 11/2009 | Lin et al. ...................... | 455/3.01 |
| 2010/0093364 A1 | * | 4/2010 | Ribeiro et al. .............. | 455/452.2 |
| 2010/0150077 A1 | * | 6/2010 | Nanda et al. ................. | 370/328 |
| 2010/0202322 A1 | * | 8/2010 | Cai et al. ....................... | 370/254 |
| 2010/0291940 A1 | * | 11/2010 | Koo et al. ..................... | 455/450 |
| 2010/0317339 A1 | * | 12/2010 | Koc .............................. | 455/424 |
| 2011/0083035 A1 | * | 4/2011 | Liu et al. ........................ | 714/4.1 |
| 2011/0255431 A1 | * | 10/2011 | Wang et al. ................... | 370/252 |
| 2012/0203914 A1 | * | 8/2012 | Moeller et al. ............... | 709/227 |
| 2012/0282934 A1 | * | 11/2012 | Simonsson et al. .......... | 455/446 |

FOREIGN PATENT DOCUMENTS

| | | |
|---|---|---|
| WO | 2012/006159 A2 | 1/2012 |
| WO | 2012/006159 A3 | 2/2012 |

OTHER PUBLICATIONS

International Search Report and Written Opinion received for PCT Patent Application No. PCT/US2011/042381, mailed on Dec. 28, 2011, 9 pages.

(Continued)

*Primary Examiner* — Farah Faroul
(74) *Attorney, Agent, or Firm* — Sutherland Asbill & Brennan LLP

(57) ABSTRACT

Techniques are disclosed involving media access. For instance, wireless connections may be assigned into one or more groups. The assignments may be based on interference characteristics. Connection(s) within each of these groups may have acceptable interference characteristics with each other. Further, media access may be granted based on these groups. For example, if a device wishes to communicate across one of the connections, access may be granted for concurrent connections among all connections in the corresponding group. The granting of such access may be performed by a centralized controller device, such as an access point.

19 Claims, 7 Drawing Sheets

(56) References Cited

OTHER PUBLICATIONS

Subramanian et al., "Spatial Reuse Strategies in 60 GHz", IEEE 802.11-10/0250r0, Mar. 15, 2010, pp. 1-28.
Derham et al., "Scheduled Spatial Reuse with Collaborative Beamforming", IEEE 802.11-10/0487r1, May 16, 2010, pp. 1-21.
Wang et al., "A Flexible Beam Training Protocol for 60GHz May 2010 mm-Wave Communication (TGad)", IEEE 802.11-10/0496r1, May 17, 2010, pp. 1-22.
International Preliminary Report on Patentability and Written Opinion received for PCT Application No. PCT/US2011/042381, issued on Jan. 8, 2013, 5 pages.

* cited by examiner

| Frame Control 308 | Duration 310 | Receive Address 302 | Transmit Addres 304 | Target Address 306 | FCS 312 |

FIG. 3

| Frame Control 412 | Duration 414 | Receive Address 402 | Transmit Address 404 | Target Address 406 | Group ID 408 | Priority 410 | FCS 416 |

FIG. 4

DIRECTIONAL MEDIA ACCESS TECHNIQUES WITH SPATIAL REUSE

BACKGROUND

Many wireless networks employ multiple access techniques to provide devices with media access. For example, wireless local area networks (WLANs) defined by the Institute of Electrical and Electronic Engineers (IEEE) 802.11 standards employ a carrier sense multiple access with collision avoidance collision (CSMA/CA) media access technique, which works well with bursty traffic.

In accordance with CSMA/CA, a device wishing to transmit data has to first listen to the communications medium for a predetermined amount of time to determine whether or not another device is transmitting. If the device senses that the communications medium is idle, it may begin transmitting its data. However, if the device senses that another device is transmitting, the device defers its transmission for a randomly determined backoff interval.

Interest in millimeter wave (e.g., 60 Gigahertz) networks is increasing. For example, work is underway to develop an IEEE 802.11 WLAN standard (IEEE 802.11ad) having 60 GHz features. Such networks may make extensive use of beamformed (directional) transmissions. Unfortunately, CSMA/CA does not work well in environments employing directional transmissions. This is because carrier sensing in such environments can be impaired.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein:

FIGS. 3 and 4 are diagrams of an exemplary message formats;

DETAILED DESCRIPTION

Embodiments provide techniques involving media access. For instance, embodiments may assign wireless connections into one or more groups. The assignments may be based on interference characteristics. Connection(s) within each of these groups may have acceptable interference characteristics with each other. Further, media access may be granted based on these groups. For example, if a device wishes to communicate across one of the connections, access may be granted for concurrent communications among all connections in the corresponding group. The granting of such access may be performed by a centralized controller device, such as an access point.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As discussed above, access techniques that are based on carrier sensing do not work well in environments employing directional transmissions. For instance, as a result of directional listening and transmitting, the signal strength at third party devices not involved in the exchange can be very low. This makes the performance of carrier sensing problematic. For example, carrier sensing in such environments often exhibit a shortcoming called the deafness problem.

Figure 1:
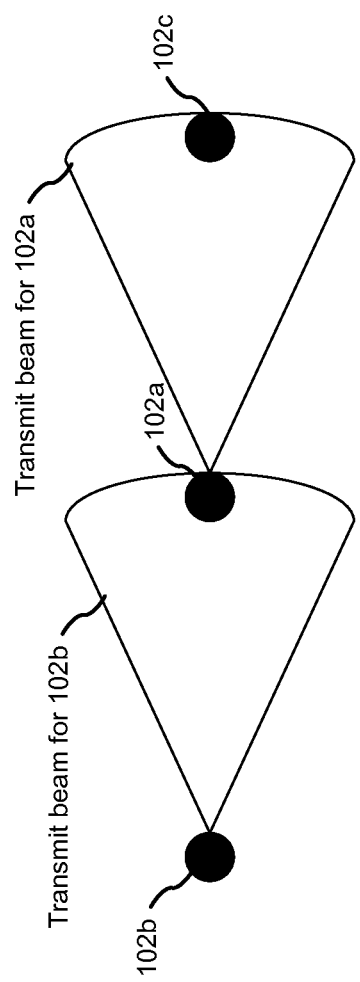
FIG. 1 is a diagram showing a transmission scenario.

FIG. 1 is a diagram illustrating an example of this problem. FIG. 1 shows three nodes: a node 102a, a node 102b, and a node 102c. As shown in FIG. 1, nodes 102a-c employ directional transmission patterns 104a-c, respectively.

When node 102a is communicating with node 102c, both nodes are beam-formed towards each other. In this example, node 102b wants to transmit to node 102a. However, if CSMA/CA is employed, node 102b will keep trying to transmit to 102a. As a result, node 102b will keep backing off with larger and larger contention windows after each transmission failure. This problem occurs because node 102b cannot sense the directional transmission from node 102a to node 102c. Embodiments may advantageously overcome this deafness problem through the techniques described herein.

The techniques described herein are discussed in the context of IEEE 802.11 wireless local area networks (WLANs). However, these techniques are not limited to such networks. Thus, these techniques may be employed in a variety of network types. Examples of such networks include Institute of Electrical and Electronic Engineers (IEEE) 802.15 wireless personal area networks (WPANs), such as Bluetooth networks. Also, these techniques may be employed with WiGig networks. WiGig networks are 60 GHz networks defined by the Wireless Gigabit Alliance (such as in the version 1.0 WiGig Specification). Further exemplary networks include IEEE 802.16 wireless metropolitan area networks (WMANs), such as WiMAX networks. WiMAX networks may support directional transmissions through beamforming capabilities. Also, the techniques described herein may be employed in millimeter wave (e.g., 60 GHz) networks. These networks are provided as examples, and not as limitations. Accordingly, the techniques described herein may be employed with other network types.

Figure 2:
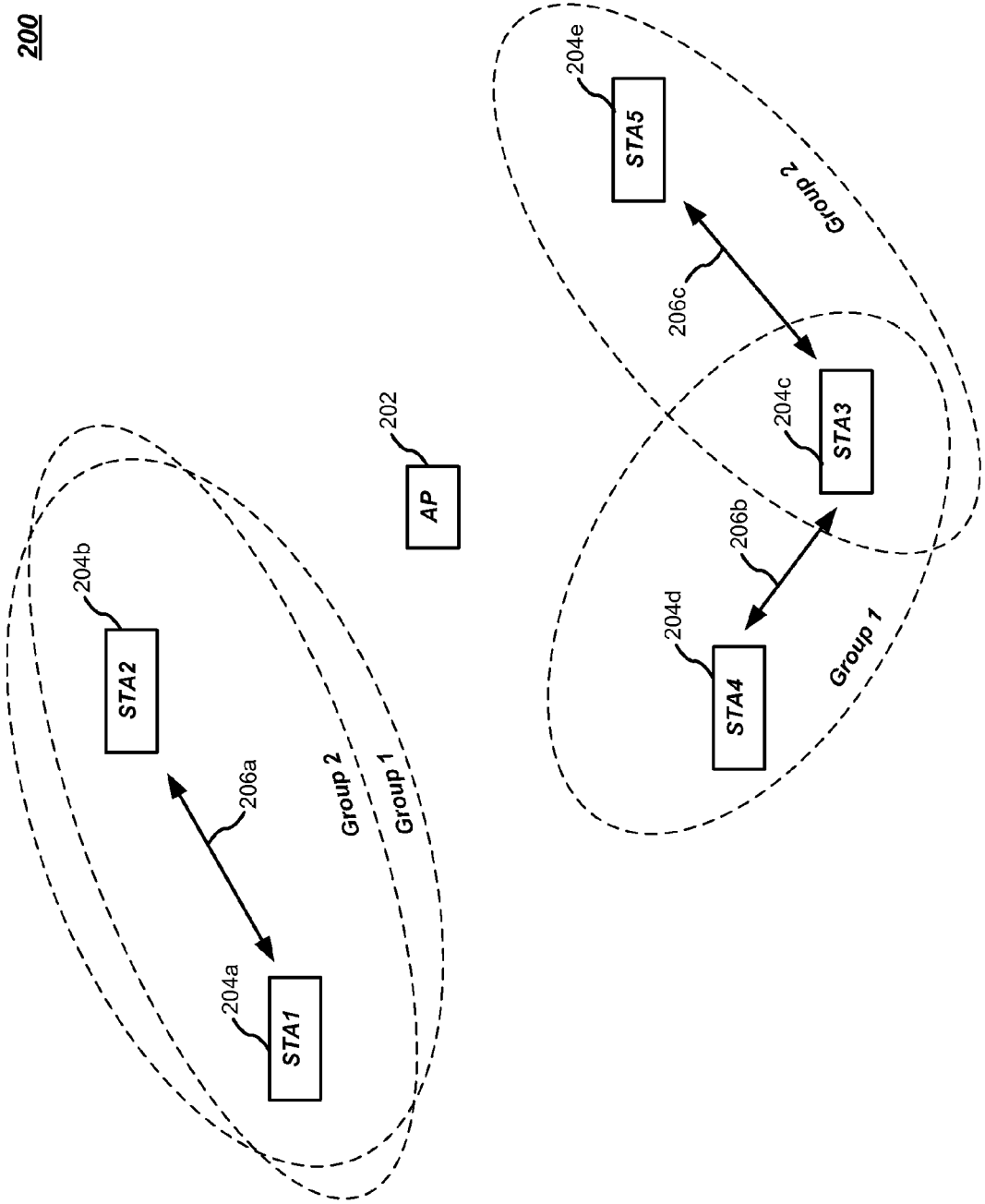
FIG. 2 is a diagram showing an exemplary operational environment.

FIG. 2 is a diagram of an exemplary operational environment 200 in which the techniques described herein may be employed. Embodiments, however, are not limited to this environment. The environment of FIG. 2 includes multiple wireless communications devices. More particularly, these devices include an access point (AP) 202, and multiple wireless stations (STAs) 204a-e. These STAs are also identified in FIG. 2 as STA1, STA2, STA3, STA4, and STA5.

The devices of FIG. 2 may employ directional or beam-formed wireless transmissions when communicating with each other. These transmissions may comprise millimeter wave (e.g., 60 GHz) signals. Peer-to-peer connections exist between STAs 204. For instance, FIG. 2 shows a connection 206a between STA1 and STA2, a connection 206b between STA3 and STA4, and a connection 206c between STA3 and STA5.

As described herein, peer-to-peer connections may be assigned to one or more groups. For instance, FIG. 2 shows connection 206a being assigned to a Group 1 and a Group 2. Also, FIG. 2, shows connection 206b being assigned to Group 1, and connection 206c being assigned to Group 2.

In embodiments, group assignments may be made by an access point, such as AP 202. More particularly, assigning connections into groups involves the AP scheduling interference measurements for each peer link. This scheduling may occur when STAs are in idle mode. MG: STAs can also measure interference during their data transmission. If excessive interference is detected, the STAs can indicate to the AP such that their connection may be assigned to a different group.

The interference measurements involve the participants of a connection sending transmissions, while the remaining STAs (which are in the directional receive mode for their corresponding peer-to-peer connections) take signal energy measurements regarding these transmissions. This may involve the remaining STAs measuring a noise floor.

For instance, AP 202 may schedule STA1 and STA2 to transmit and receive over their link 206a. While this occurs, STA3, STA4, and STA5 (which are in a directional mode to receive transmissions from their corresponding peer-to-peer connections) measure the interference energy from the link 206a transmissions. In turn, STA3, STA4, and STA5 each provide information regarding these measurements to AP 202 in one or more transmissions. In embodiments, this information may include the actual measurement data. However, other forms of information that indicate interference levels or characteristics may be employed.

Similarly, AP 202 may schedule such measurements for links 206b and 206c. For instance, STA1, STA2, and STA5 may make measurements while STA3 and STA4 transmit and receive across link 206b. Likewise, STA1, STA2, and STA4 may make measurements while STA3 and STA5 transmit and receive across link 206c. As described above, the information regarding of these measurements may be provided to AP 202 in one or more transmissions.

Based on the information regarding the interference measurements, AP 202 assigns peer-to-peer connections to one or more groups. This may involve AP 202 assigning non-interfering connections to the same group. In embodiments, a non-interfering connection is ones that provides interfering energy (if any) that is acceptable (e.g., below a predetermined level).

As described above, FIG. 2 shows the assignment of connections into Group 1 and Group 2. AP 202 made these assignments because peer-to-peer connections in the same group are ones that are non-interfering with each other. Thus, connections in the same group can operate simultaneously.

In embodiments, communications across peer-to-peer connections are controlled by an AP. For example, a STA needs to obtain approval from an AP to engage in communications across one of it peer-to-peer links. This may involve the exchange of request and response messages with an AP. For example, a STA may send a Target Request to Send (TRTS) message to an AP. In response, the AP may send a corresponding Target Clear to Send (TCTS) message.

FIG. 3 is a diagram of an exemplary TRTS message format. As shown in FIG. 3, this format includes three addresses: a receive address 302 (e.g., an address of the AP), a transmit address 304 (e.g., an address of the requesting STA), and a target address 306 (e.g., an address of a requesting STA's peer). In addition, FIG. 3 shows that this format includes a frame control field 308, a duration field 310, and an FCS field 312.

Duration field 310 indicates a duration of an upcoming transmission opportunity (TXOP) in which the requesting STA (as indicated by transmit address 304) wishes to communicate with its peer (as indicated by target address 306). In embodiments, this may be a requested duration.

Frame control field 308 includes an identifier that identifies the message as a TRTS message. FCS field 312 includes a frame check sequence for the message.

After receiving a TRTS message, an AP may respond by transmitting a TCTS message. This message allows connections in a particular group to be used. In embodiments, the AP may transmit the TRTS message in an omni directional mode to ensure that it is received by all STAs associated with the AP.

FIG. 4 is a diagram of an exemplary TCTS message format. As shown in FIG. 4, this format includes a receive address 402 (i.e., a broadcast address indicating that the TCTS message is directed to all STAs), a transmit address 404 (i.e., an address of the AP), a target address 406 (i.e., an address of a requesting STA's peer), a Group ID field 408, and a transmission priority field 410. In addition, FIG. 4 shows that this format includes a frame control field 412, a duration field 414, and an FCS field 416.

Group ID field 408 indicates a particular group of peer-to-peer connections. In this case, the Group ID is set to 1. This indicates that all peer links belonging to Group 1 may operate (convey transmissions) in the following Transmission Opportunity (TXOP).

Transmission priority field 410 indicates which peer STA in a connection may transmit first. For example, if this field is set to 1, the peer STA with a higher MAC (media access control) address may transmit first. However, if this field is set to 0, the peer STA with a lower MAC address may transmit first. However, a STA given a lower priority through transmission priority field 410 may transmit first under certain conditions. For instance, a lower priority STA may transmit first when it senses that the communications medium has been idle for a predetermined time after receiving the TCTS frame. In embodiments, this time interval may be a Point Interframe Space (PIFS) interval.

Additionally or alternatively, when a STA is identified in the TCTS by target address 406, the identified STA may operate as the lower priority STA. However, this STA may transmit first under conditions. Exemplary conditions are described in the preceding paragraph.

Duration field 414 indicates the duration of the upcoming transmission opportunity (TXOP) in which the STAs belonging to the group (as indicated by Group ID field 408) may communicate. In embodiments, this duration may be based on the duration indicated in the corresponding TRTS message.

Frame control field 412 includes an identifier that identifies the message as a TCTS message. FCS field 416 includes a frame check sequence for the message.

In embodiments, both TRTS and TCTS messages may be transmitted using a modulation coding scheme (MCS) suitable for low signal to noise ratio (SNR) environments. This because (in embodiments) only one end of the link has beamforming gain. An exemplary MCS is MCS0 as provided by IEEE 802.11ad.

Embodiments may employ a backoff procedure. For instance, if a STA sends a TCTS message and does not receive a corresponding TCTS, it may assume a collision has occurred and retransmit the TCTS in accordance with the backoff procedure (e.g., an exponential backoff procedure).

A TRTS/TCTS example is now described in the context of FIG. 2. In this example, STA1 wishes to communicate with STA2 directly. However, before it can do this, it transmits a TRTS message to AP 202.

After receiving the TRTS message, AP 202 determines that the connection between STA1 and STA2 (i.e., connection 206a) belongs to Group 1. In response, AP 202 sends a corresponding TCTS message, which can be received by all STAs (i.e., STA1-STA5). This TCTS message includes a Group ID field set to 1 (which indicated Group 1), a target address that indicates STA2.

Upon receipt of the TCTS message, the STAs recognize that it gives permission for Group 1 connections. Based on this recognition, STA1 and STA2 (whose connection is in Group 1) steer their beams towards each other. Similarly, STA3 and STA4 (whose connection is also in Group 1) steer their beams towards each other.

Since the TCTS message indicates the address of STA2 as the Target Address, STA2 waits for STA1 to transmit first. However, if a predetermined time interval (e.g., PIFS) elapses after receiving the TCTS frame and STA2 senses that the communications medium is free, it can start its data transmission towards its peer STA (STA1).

However, as described above, which of STA3 and STA4 transmits first may be determined by the transmission priority field in the TCTS message. For instance, the peer STA with a higher MAC (media access control) address may transmit first when this field is set to 1. In contrast, if this field is set to 0, the peer STA with a lower MAC address may transmit first. However, as described above the STA given a lower priority may transmit first under certain conditions (such as when it senses that the communications medium has been idle for a predetermined time after receiving the TCTS frame).

As described herein. a TRTS/TCTS exchange also sets up a transmission opportunity (TXOP) in the network. Within the TXOP, a STA can transmit one or more Aggregated MAC Protocol Data Units (A-MPDUs) to STA2 at a high data rate. In embodiments, up to 64 MPDUs may be aggregated in one A-MPDU, which has a maximum size limit of 64K. Upon receiving an A-MPDU, the peer STA replies with a Block ACK (BA) that identifies which MPDUs in the A-MPDU have been received successfully.

Other devices that do not belong to the group designated by the TCTS (e.g., devices not in Group 1, such as STA5) learn from the TCTS that there will be an on-going transmission. Thus, these devices may set their NAVs for the duration of the TXOP indicated in the TCTS. In embodiments, STAs transmitting in the TXOP are required to obey the TXOP duration and should not transmit beyond the TXOP boundary that was defined by the TRTS/TCTS exchange.

Figure 5:
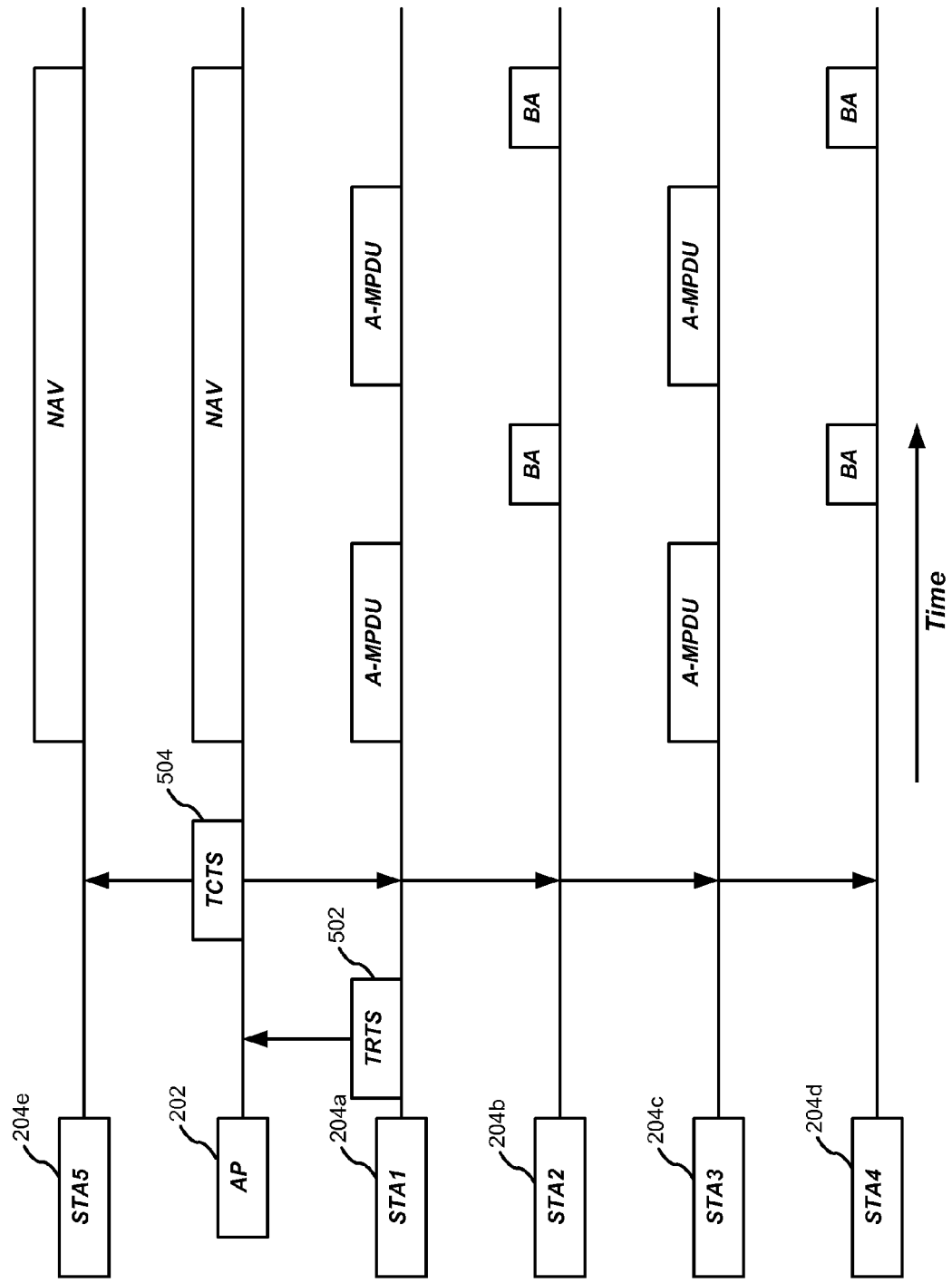
FIG. 5 is a diagram showing actions of multiple devices in a wireless communications environment.

FIG. 5 is a diagram showing actions of the devices of environment 200. The actions are shown to occur along a general time axis. For instance, FIG. 5 shows, STA1 sending a TRTS message 502 to AP 202. In response, AP 202 sends a TCTS message 504. This message includes a group identifier of 1. Therefore, TCTS message 504 indicates communications may occur between STA1 and STA2 (across connection 206a), as well as between STA3 and STA4 (across connection 206b).

Accordingly, during a TXOP established by TCTS message 504, wireless communications may occur across connections 206a and 206b. For instance, FIG. 5 shows A-MPDUs and BAs being exchanged between STA1 and STA2, as well as between STA3 and STA4. Further, FIG. 5 shows that STA5 and AP 202 (which do not have a connection in Group 1) each set their NAV during the established TXOP.

Figure 6:
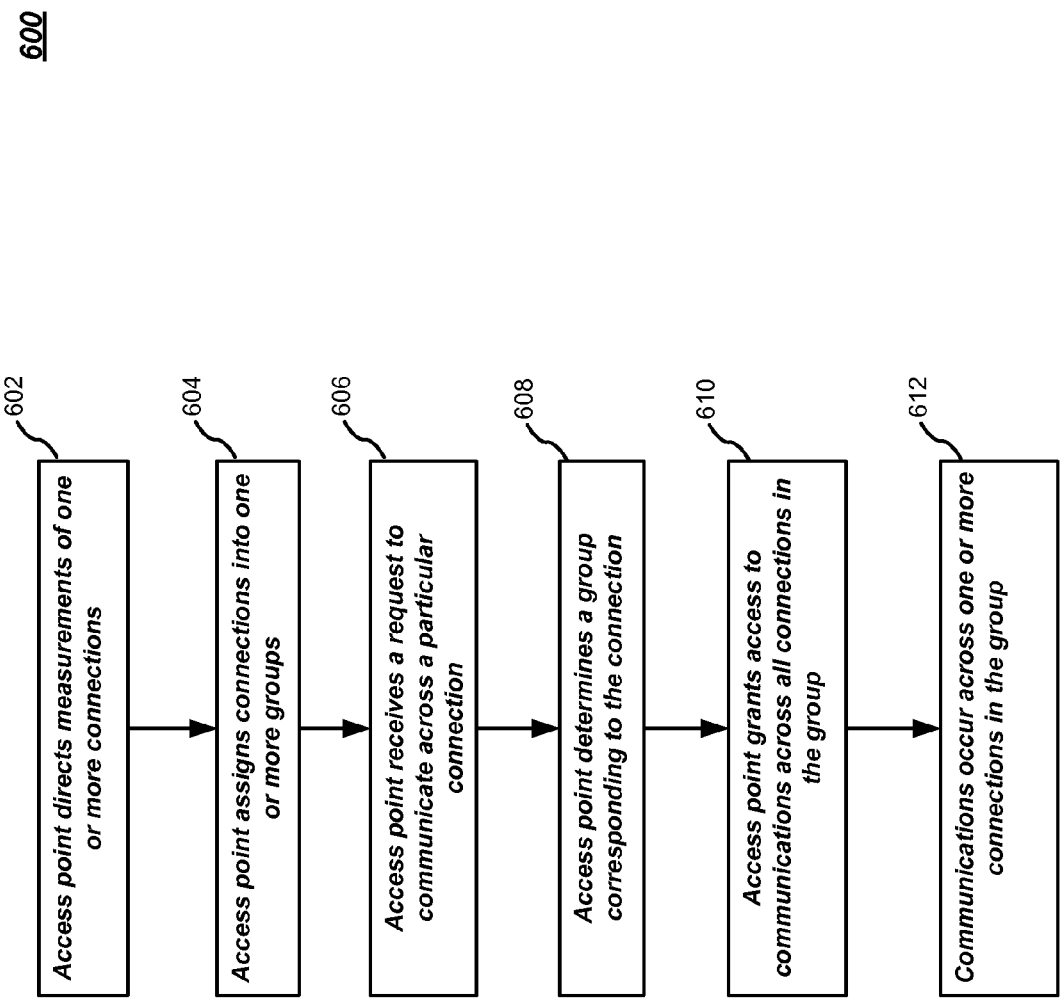
FIG. 6 is a diagram of an exemplary logic flow.

FIG. 6 illustrates an embodiment of a logic flow. In particular, FIG. 6 illustrates a logic flow 600, which may be representative of the operations executed by one or more embodiments described herein. These operations may be employed in the environment of FIG. 2. Embodiments, however, are not limited to this context. Although FIG. 6 shows a particular sequence, other sequences may be employed. Also, the depicted operations may be performed in various parallel and/or sequential combinations.

At a block 602, an access point directs measurements of one or more connections to be taken. These measurements may each characterize interference from a particular connection, may be made in the manner described above.

Based on these measurements, the access point assigns each of the connections into one or more groups at a block 604. As described herein, connection(s) within each of these groups may have acceptable interference characteristics with each other.

At a block 606, the access point receives a request from a wireless communications device (e.g., STA) to communicate across a particular one of the plurality of wireless connections. This request may be in the form of a TRTS message.

In response to the request, the access point determines (at a block 608) a group corresponding to the wireless connection indicated in the request. In turn, the access point grants (at a block 610) access to communications across all connections in this group. This grant may be for a particular time duration (e.g., TXOP). In embodiments, block 610 involves sending a TCTS message.

Based on the grant of block 610, a block 612 is performed. At this block, communications across one or more connections in the group may occur during the indicated time duration.

Figure 7:
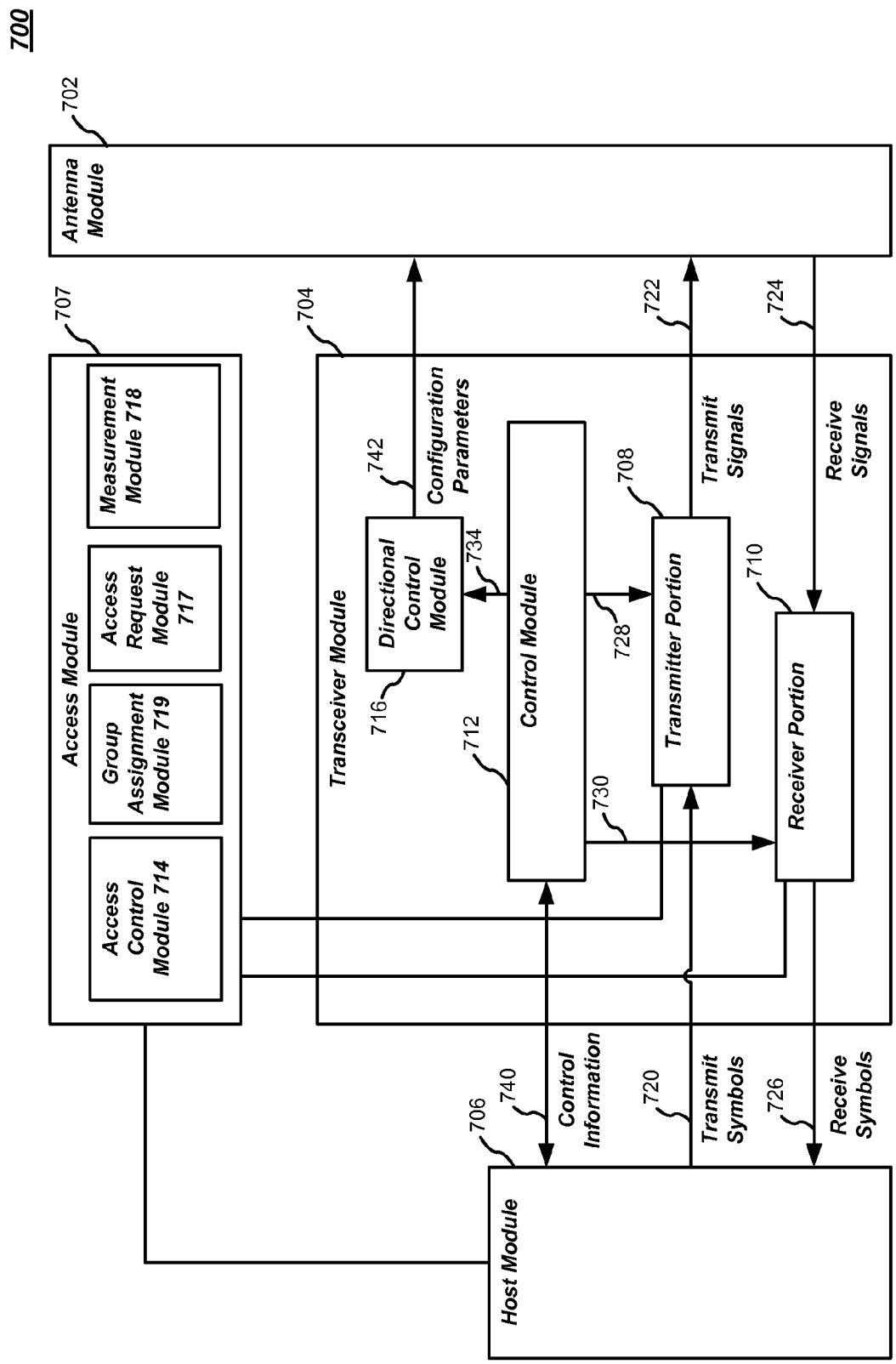
FIGS. 7 and 8 are diagrams of exemplary device implementations.

FIG. 7 is a diagram of an implementation 700 that may be included in a wireless device, such as a STA and/or an access point. As shown in FIG. 7, implementation 700 may include an antenna module 702, a transceiver module 704, a host module 706, and an access module 707. These elements may be implemented in hardware, software, or any combination thereof.

Antenna module 702 provides for the exchange of wireless signals with remote devices. Moreover, antenna module 702 may transmit wireless signals through one or more directional radiation patterns. Thus, antenna module 702 may include multiple antennas and/or multiple radiating elements (e.g., phased-array radiating elements). Details regarding exemplary implementations of antenna module 702 are described below with reference to FIG. 8.

FIG. 7 shows that transceiver module 704 includes a transmitter portion 708, a receiver portion 710, a control module 712, and a directional control module 716. These elements may be implemented in hardware, software, or any combination thereof.

Transceiver module 704 provides an interface between antenna module 702 and host module 706. For instance, transmitter portion 708 within transceiver module 704 receives symbols 720 from host module 706 and generates corresponding signals 722 for wireless transmission by antenna module 702. This may involve operations, such as modulation, amplification, and/or filtering. However, other operations may be employed.

Conversely, receiver portion 710 within transceiver module 704 obtains signals 724 received by antenna module 702 and generates corresponding symbols 726. In turn, receiver portion 710 provides symbols 726 to host module 706. This generation of symbols 726 may involve operations, including (but not limited to) demodulation, amplification, and/or filtering.

The symbols exchanged between host module 706 and transceiver module 704 may form messages or information associated with one or more protocols, and/or one or more user applications. Thus, host module 706 may perform operations corresponding to such protocol(s) and/or user application(s). Exemplary protocols include various media access, network, transport and/or session layer protocols. Exemplary user applications include telephony, messaging, e-mail, web browsing, content (e.g., video and audio) distribution/reception, and so forth.

In addition, host module 706 may exchange control information 740 with transceiver module 704. This control information may pertain to the operation and status of transceiver module 704. For instance, control information 740 may include directives that host module 706 sends to transceiver module 704. Such directives may establish operating parameters/characteristics for transceiver module 704. Also control information 740 may include data (e.g., operational status information) that host module 706 receives from transceiver module 704.

As described above, transmitter portion 708 generates signals 722 from symbols 720, and receiver portion 710 generates symbols 726 from received signals 724. To provide such features, transmitter portion 708 and receiver portion 710 may each include various components, such as modulators, demodulators, amplifiers, filters, buffers, upconverters, and/or downconveters. Such components may be implemented in hardware (e.g., electronics), software, or any combination thereof.

Signals 722 and 724 may be in various formats. For instance, these signals may be formatted for transmission in IEEE 802.11, IEEE 802.15, WiGig, and/or IEEE 802.16 networks. However, embodiments are not limited to these exemplary networks may be employed.

Control module 712 governs various operations of transceiver module 704. For instance, control module 712 may establish operational characteristics of transmitter portion 708 and receiver portion 710. Such characteristics may include (but are not limited to) timing, amplification, modulation/demodulation properties, and so forth. As shown in FIG. 7 the establishment of such characteristics may be implemented in directives 728 and 730, which are sent to transmitter portion 708 and receiver portion 710, respectively.

In addition, control module 712 governs the employment of directional transmission and reception features. In particular, FIG. 7 shows control module 712 generating directives 734, which are sent to directional control module 716. Based on directives 734, directional control module 716 generates configuration parameters 742, which are sent to antenna module 702.

Configuration parameters 742 may specify particular parameters to be applied to each antenna and/or radiating element within antenna module 702. Examples of such parameters include (but are not limited to) amplification gains, attenuation factors, and/or phase shift values.

Access module 707 performs operations in accordance with the access techniques described herein. As shown in FIG. 7, access module 707 includes an access control module 714, a group assignment module 719, an access request module 717, and a measurement module 718. These elements may be implemented in any combination of hardware and/or software.

Access control module 714 performs operations described herein involving the granting of access (e.g. performed by an access point). For instance, access module 714 may receive TRTS messages (e.g., from receiver portion 710) and generate corresponding TCTS messages. In turn, such TCTS messages may be transmitted via transmitter portion 708.

Group assignment module 719 performs operations involving the assignment of connections to groups, as described herein. Such operations may be performed by an access point. Accordingly, group assignment module 719 may generate messages directing measurements regarding interference to be taken. These messages may be transmitted via transmitter portion 708. In turn, group assignment module 719 may receive information regarding such measurements (e.g., from receiver portion 710). Based on this information, assignment of connections into groups may be performed.

Access request module 717 performs operations involving requesting of media access, as described herein. Such operations may be performed by a STA. For instance, access request module 717 may generate TRTS messages (e.g., in response to directives from host module 706). These messages may be transmitted to an access point via transmitter portion 708. Also, access request module 717 may receive corresponding TCTS messages (e.g., from receiver portion 710). Based on these messages, communications may occur.

Measurement module 718 performs measurements involving interference from other connections, as described herein. Such measurements may be performed by a STA in response from directives received by an access point. In turn, information regarding these measurements are provided to the access point (via transmitter portion 708). Measurements made by measurement module 718 may be from hard symbols received from receiver portion 710 (e.g., based on a bit error rate determined through comparison with a predetermined sequence). Also, such measurements may be based on soft symbols generated by receiver portion 710 from received wireless signals. Moreover, such measurements may be generated from un-demodulated signals provided by receiver portion 710.

Figure 8:
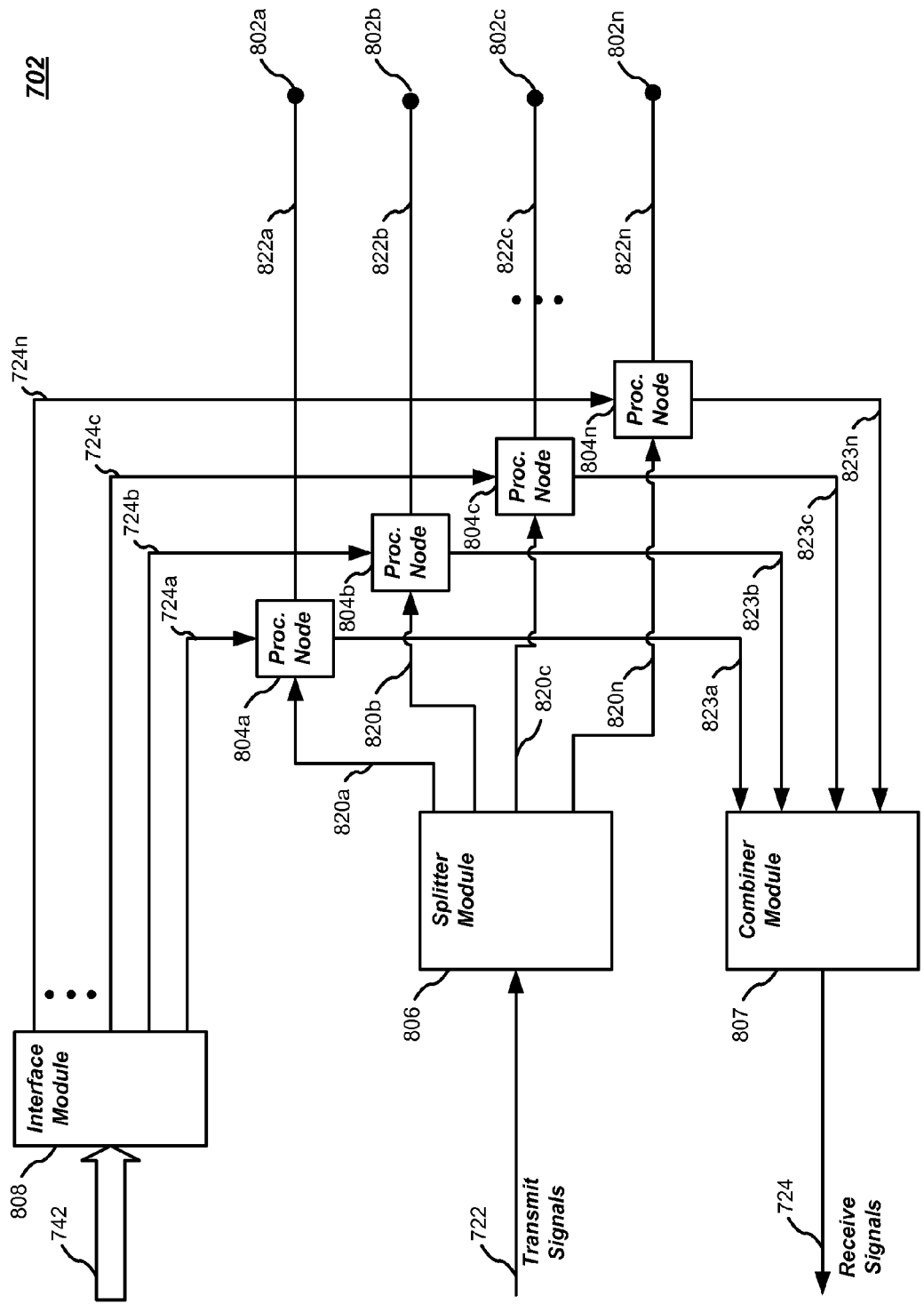

FIG. 8 is a diagram showing an exemplary implementation of antenna module 702. As shown in FIG. 8, this implementation includes multiple radiating elements 802a-n, multiple processing nodes 804a-n, a splitter module 806, a combiner module 807, and an interface module 808. These elements may be implemented in hardware, software, or any combination thereof.

Each radiating element 802 may be a distinct antenna. Alternatively or additionally, each radiating element 802 may be a radiating element within a phased-array or switched-beam antenna. Thus, together, radiating elements 802a-n may form any combination of one or more distinct antennas, one or more phased arrays, and/or one or more switched beam antennas. As shown in FIG. 8, radiating elements 802a-n are each coupled to a corresponding one of processing nodes 804a-n.

As shown in FIG. 8, splitter module 806 receives signal 722 (which is generated by transceiver module 704 of FIG. 7). Upon receipt, splitter module 806 "splits" signal 722 into substantially identical input signals 820a-n. This splitting may occur with some degree of insertion loss. Also, splitter module 806 may perform operations, such as amplification and/or filtering. Input signals 820a-n are sent to processing nodes 804a-n, respectively.

Processing nodes 804a-n generate processed signals 822a-n from input signals 820a-n, respectively. In turn, processed signals 822a-n are sent to radiating elements 802a-n, respectively. Conversely, processing nodes 804a-n may generate processed signals 823a-n from wireless signals received by elements 802a-n. These signals may be combined by combiner module 807 into receive signals 724.

In generating processed signals 822a-n and 823a-n, processing nodes 804a-n may perform various operations. Examples of such operations performed by processing nodes 804a-n include (but are not limited to) attenuation, amplification, and/or phase shifting. Switching is a further exemplary operation. For example, one or more of processing nodes 804a-n may selectively pass or block their corresponding signals.

The manner in which processing nodes 804a-n generate processed signals 822a-n and 823a-n is determined by control signals 824a-n, respectively. Thus, these signals may convey attenuation factors, amplification gains, phase shift values, switching directives, and so forth.

In embodiments, control signals 824a-n are included in configuration parameters 742, which are received by interface module 808. These parameters may be received in various formats (e.g., analog, digital, serial, parallel, etc.). Interface module 808 extracts these parameters and formats them as control signals 824a-n. As described above, control signals 824a-n are sent to processing nodes 804a-n, respectively.

The implementation of FIG. 8 is shown for purposes of illustration and not limitation. Accordingly, implementations of antenna module 802 may include other elements. For example, implementations may include one or more amplifiers and/or filters. Such amplifier(s) and/or filters may be coupled between processing nodes 804a-n and elements 802a-n.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A method, comprising:
   directing measurements associated with a plurality of wireless connections;
   assigning each of the plurality of wireless connections to one or more groups based at least in part on the measurements;
   receiving a request to communicate across a particular one of the plurality of wireless connections; and
   in response to the request, granting access for communications across all wireless connections in the corresponding group.

2. The method of claim 1, wherein each of the plurality of wireless connections is a peer-to-peer connection between two wireless communications devices.

3. The method of claim 1, wherein each of the plurality of wireless connections employs directional transmissions during communications.

4. The method of claim 1, wherein said assigning is based on interference measurements corresponding to each of the plurality of wireless connections.

5. The method of claim 1, further comprising:
   directing devices corresponding to the plurality of wireless connections to perform the interference measurements.

6. The method of claim 1:
   wherein said receiving the request comprises receiving a message, the message including source wireless communications device address and a target wireless communications device address; and
   wherein the particular wireless connection is identified by the source wireless communications device address and the target wireless communications address.

7. The method of claim 1, wherein said granting access comprises granting access for a time duration.

8. The method of claim 1, wherein said granting access comprises indicating a transmission priority, the transmission priority designating which of two peer devices may transmit first.

9. The method of claim 1, wherein said granting access comprises an access point sending a message, the message directed to all wireless communications devices associated with the access point.

10. An access point, comprising:
    a communications interface module, comprising one or more processors, to receive a request for communicating across a wireless communications link; and
    an access control module, comprising a second one or more processors, to determine a group corresponding to the wireless communications link based at least in part on a level of interference associated with the wireless connection link, and to generate a response to the request, the response to grant access for communications across all wireless connections in the corresponding group;
    wherein the communications interface module is to send the response to all wireless communications devices in the corresponding group.

11. The access point of claim 10, further comprising a group assignment module, comprising the second one or more processors, to assign a plurality of wireless connections into one or more groups based at least in part on interference associated with the plurality of wireless connections, wherein each group includes one or more of the plurality of wireless connections.

12. The access point of claim 11, wherein the group assignment module is to assign the plurality of wireless connections into the one or more groups based at least in part on interference measurements corresponding to each of the plurality of wireless connections.

13. The access point of claim 11, wherein the communications interface module is to send a message directing devices corresponding to the plurality of wireless connections to perform the interference measurements.

14. A wireless communications device, comprising:
an access request module to generate a request for communicating across a wireless connection;
a communications interface module, comprising one or more processors, to send the request to an access point, and to receive a corresponding response from the access point, the response granting access for communications across all wireless connections in a group corresponding to the wireless connection, wherein the group is determined based at least in part on interference level measurements associated with the wireless connection.

15. The wireless communications device of claim 14, further comprising:
a measurement module, comprising a second one or more processors, to generate interference level measurements from one or more remote wireless connections;
wherein the communications interface module sends information regarding the interference level measurements to the access point.

16. An article comprising a non-transitory machine-accessible medium having stored thereon instructions that, when executed by a machine, cause the machine to:
direct measurements associated with a plurality of wireless connections;
assign each of the plurality of wireless connections to one or more groups based at least in part on the measurements;
receive a request to communicate across a particular one of the plurality of wireless connections; and
in response to the request, grant access for communications across all wireless connections in the group corresponding to the particular one of the plurality of wireless connections.

17. The article of claim 16, wherein the measurements are interference measurements corresponding to each of the plurality of wireless connections.

18. The article of claim 17, further comprising instructions that, when executed, cause the machine to:
direct devices corresponding to the plurality of wireless connections to perform the interference measurements.

19. The article of claim 16, wherein each of the plurality of wireless connections employs directional transmissions during communications.

\* \* \* \* \*